(12) United States Patent
Grassl et al.

(10) Patent No.: US 6,932,737 B2
(45) Date of Patent: Aug. 23, 2005

(54) CONTROL UNIT FOR A TRANSMISSION AND ASSOCIATED OPERATING METHOD

(75) Inventors: Georg Grassl, Hainsacker (DE); Florian Gutknecht-Stoehr, Regensburg (DE); Gregor Probst, Landshut (DE); Martin Rampeltshammer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/345,645

(22) Filed: Jan. 16, 2003

(65) Prior Publication Data

US 2003/0114269 A1 Jun. 19, 2003

Related U.S. Application Data

(63) Continuation of application No. PCT/DE01/02447, filed on Jul. 3, 2001.

(30) Foreign Application Priority Data

Jul. 18, 2000 (DE) .......................................... 100 34 872

(51) Int. Cl.[7] ............................ B60K 41/02; B60K 1/02
(52) U.S. Cl. ............................................. 477/4; 477/3
(58) Field of Search ............................... 477/3, 4, 115, 477/209; 701/51, 55

(56) References Cited

U.S. PATENT DOCUMENTS

| | | | | |
|---|---|---|---|---|
| 4,962,462 A | * | 10/1990 | Fekete ................... | 180/65.8 X |
| 5,318,142 A | | 6/1994 | Bates et al. .............. | 180/65.2 |
| 5,720,690 A | * | 2/1998 | Hara et al. ................. | 477/3 X |
| 6,336,888 B1 | * | 1/2002 | Eguchi ......................... | 477/3 |
| 6,428,444 B1 | * | 8/2002 | Tabata ........................... | 477/3 |
| 6,459,980 B1 | * | 10/2002 | Tabata et al. ............. | 701/51 X |
| 2003/0109969 A1 | * | 6/2003 | Yamaguchi et al. ...... | 701/51 X |

FOREIGN PATENT DOCUMENTS

| | | | | |
|---|---|---|---|---|
| DE | 36 32 960 C2 | 7/1988 | .......... | B60K/41/06 |
| DE | 42 30 101 A1 | 3/1994 | .............. | B60T/8/00 |
| DE | 43 30 391 A1 | 10/1994 | .......... | F16H/59/00 |
| DE | 196 23 847 A1 | 12/1996 | .......... | F16H/59/04 |
| DE | 100 47 933 A1 | 6/2001 | .......... | B60K/41/00 |
| EP | 0 800 949 A2 | 10/1997 | ............. | B60K/6/04 |
| EP | 0 903 259 A2 | 3/1999 | .......... | B60K/41/00 |
| EP | 0 933 245 A2 | 8/1999 | ............. | B60L/7/20 |
| JP | 06055941 | 3/1994 | ............. | B60K/6/00 |
| JP | 09135502 | 5/1997 | ............. | B60L/7/24 |

* cited by examiner

Primary Examiner—Roger Pang
(74) Attorney, Agent, or Firm—Baker Botts L.L.P.

(57) ABSTRACT

A control unit (14) for regulating the transmission ratio of a transmission (8) which is located in a drive train together with a motor (1), in order to obtain braking assistance through the braking torque of the motor (1) is disclosed. The control unit comprises several signal inputs for receiving the desired braking torque (MSET) and the number of revolutions (nACT) of the motor (1) and/or the vehicle speed; a calculation unit for determining the suitable transmission ratio (ü) of the transmission (8) for achieving the desired braking torque in accordance with the desired braking torque (MSET) and the number of revolutions (nACT) or the vehicle speed; and a signal output for outputting a control signal (ü) which determines the transmission ratio of the transmission (8). An electrical generator (5) which feeds a battery (6) and which has an additional braking torque is located in the drive train. A measuring unit is provided for determining the charge status of the battery (6), this measuring unit being connected to the calculation unit on the output side in order to regulate the transmission ratio of the transmission according to the charge status of the battery (6).

22 Claims, 5 Drawing Sheets

CONTROL UNIT FOR A TRANSMISSION AND ASSOCIATED OPERATING METHOD

CROSS REFERENCE TO RELATED APPLICATION

This application is a continuation of co-pending International Application No. PCT/DE01/02447 filed Jul. 3, 2001, which designates the United States, and claims Priority to German application number DE 10034872.6 filed Jul. 18, 2000.

BACKGROUND OF THE INVENTION

The invention relates to a control unit for setting the transmission ratio of a transmission which is arranged in a drive train together with an engine and to a method for operating such a control unit.

It is known, for example from the German laid-open application DE 42 30 101 A1, to generate a predefined braking torque in a motor vehicle, on the one hand by means of the braking torque of a service brake and on the other hand by means of the braking torque (drag torque) of the engine, the service brake being relieved of loading, which is advantageous in particular in the case of long-lasting braking operations as otherwise there is the risk of the service brake being overheated and losing its optimum braking effect.

German laid-open application DE 43 30 391 A1 also discloses a control unit for a drive train of a motor vehicle in which a desired braking effect is determined from the activation of the brake pedal, which braking effect in turn leads to shifting down of the automatic transmission in order to increase the braking effect of the engine. Here, use is made of the fact that the braking effect of the engine rises as the rotational speed increases so that at a predetermined speed the braking effect created is greater in a low gear than in a higher gear.

A disadvantage of the known arrangements described above is however the fact that the braking torque of the engine increases with the rotational speed so that, in order to achieve a good braking effect of the engine, relatively high rotational speeds are necessary, which is problematic in terms of noise, wear and comfort.

SUMMARY OF THE INVENTION

The invention is therefore based on the object of providing an arrangement which, together with the service brake and the engine braking torque, generates an additional braking torque even at relatively low rotational speeds. Furthermore, the invention is based on the object of specifying an operating method for such an arrangement.

The object can be achieved by a control unit for setting the transmission ratio of a transmission which is arranged in a drive train together with an engine and an electric generator, in order to obtain braking assistance through the braking torque of the engine, and to bring about the breaking torque of the electrical generator, the generator feeding a battery. The control unit comprises a plurality of signal inputs for receiving the desired braking torque and the rotational speed of the engine and/or of the speed of the vehicle, a comparator unit for comparing the rotational speed of the engine and/or the vehicle speed with switching points of the transmission, each switching point corresponding to a rotational speed of the engine or to a vehicle speed, and for determining the transmission ratio of the transmission suitable for achieving the desired brake torque, a signal output for outputting a control signal which determines the transmission ratio of the transmission, and a calculation unit for determining the switching points of the transmission as a function of the charge status of the battery.

The generator can be connected at the output end to the battery via a controllable switching element in order to disconnect the generator from the battery when the battery is completely charged. The switching element can be connected at the output end to the battery on the one hand, and to a load resistance arrangement on the other, in order to connect the generator to the load resistance arrangement when the battery is completely charged. The transmission ratio of the transmission which can be output at the signal output when the battery is partially discharged is less than or equal to the transmission ratio of the transmission which is output at the signal output when the battery is completely charged. The transmission may have a plurality of fixed transmission stages, the switching over between the transmission stages taking place in each case at predefined switching values of the speed of the vehicle or of the rotational speed, the switching values when the battery is partially discharged being less than the corresponding switching values when the battery is completely charged. A clutch can be arranged in the drive train between the generator and the engine. The generator can be connected at the output end to a highly dynamic electrical energy store. The highly dynamic energy store can be a supercap.

A method for operating a control unit for setting the transmission ratio of a transmission, may comprise the steps:
  receiving the desired braking torque,
  determining the transmission ratio of the transmission;
  determining the charge status of the battery;
  setting the transmission ratio of the transmission as a function of the charge status of the battery.

The method may further comprise the following steps:
  switching points of the transmission are determined as a function of the charge status of the battery, each switching point corresponding to a rotational speed of the engine or to a speed of the vehicle,
  the rotational speed of the engine or the speed of the vehicle is measured,
  the transmission is shifted down when the switching points are reached.

The generator can be disconnected from the battery when the battery is completely charged. The generator can be connected to a load resistance arrangement if the battery is completely charged. The method may have also the following steps:
  the braking torque of the engine is calculated from the rotational speed of the engine,
  the braking torque of the generator is calculated from the charge status of the battery and the rotational speed of the generator,
  the necessary braking torque of the service brake is calculated from the predefined overall braking torque and the braking torques of the generator and of the engine,
  the service brake is activated with the calculated braking torque.

The engine can be switched off during a braking operation. During the braking operation the generator can be connected to a highly dynamic electrical energy store and charges it. The method may further comprise the step of receiving the rotational speed of the engine. The method may further comprise the step of receiving the speed of the vehicle.

The invention comprises the general technical teaching of utilizing the braking torque which is generated by an electrical generator arranged in the drive train, it being advantageous that the braking torque of an electrical generator is at a maximum at a given electrical power at low rotational speeds. Moreover, the efficiency of the generator is better under these conditions.

The electrical generator is preferably an integrated starter generator (ISG) which, in the driving mode, supplies the electrical system of the motor vehicle with current and when the engine is stationary can be used to start the engine. The term generator is however, to be understood here and below in a general sense and may comprise all assemblies which are coupled to the drive train and can generate a braking torque from the rotating drive train.

When utilizing the braking effect of an electrical generator to relieve the service brake of loading it is to be noted that the braking torque generated by the generator depends not only on the rotational speed in the manner described above but also on the electrical voltage or the charge status of the battery fed by the generator. On the one hand, the braking torque which is generated by the generator is lower when the battery voltage is low than at the rated voltage, which occurs, in particular, at low rotational speeds between 1000 and 3000 revolutions per minute. On the other hand, when a battery is completely charged the generator cannot charge any further energy back into the battery so that in this state of the battery the generator must not be operated with a generating effect.

The braking torque which is generated in order to relieve the service brake of loading is therefore composed, on the one hand, of the braking torque of the engine and, on the other hand, of the braking torque of the generator, the sum of these two braking torques also having a rotational speed dependence and firstly dropping as the rotational speed increases so that low rotational speeds have to be aimed at in order to reach a good braking effect as long as the battery is not completely charged and the generator can consequently contribute to the braking effect. If, however, the battery is completely charged, the generator must not be operated with a generating effect and can consequently also not contribute to the braking effect so that the braking torque which relieves the service brake of loading is generated exclusively by the engine. In this case, however, relatively high rotational speeds are to be aimed at in order to achieve a good braking effect as the braking torque which is generated by the engine increases with the rotational speed when viewed in isolation.

For this reason, the control unit according to the invention registers the charge status of the battery by means of a measuring unit and sets the transmission ratio of a transmission arranged in the drive train, as a function of the charge status of the battery, in such a way that the best possible recuperatively useable braking effect is achieved.

This means that in an automatic transmission the shifting-down points are at relatively low rotational speeds in order to keep the rotational speed in a low range, in which the generator has a good braking effect, for as long as possible.

In another variant of the invention, the generator is connected at the output end to the battery via a controllable switching element in order to disconnect the generator from the battery when the battery is completely charged. This is advantageous for protecting the battery as when the battery is completely charged the generator cannot feed any electrical energy into the battery and must therefore not be operated with a generating effect. The term switching element is to be understood here generally and comprises, for example, discrete switching elements such as relays or power semiconductors.

In a further development of the invention, the switching element connects the generator either to the battery or to a load resistance arrangement (for example electrical supplementary heater or rear windscreen heater) in order to permit the generator to be operated with a generating effect even when the battery is completely charged.

According to one variant of the invention, a further clutch is arranged in the drive train between the generator and the engine, which clutch makes it possible to reduce the rotational speed of the generator, below the idling speed of the engine for example, as a result of which the braking torque of the generator can be maximized.

In one variant of the invention, there is also provision for the engine to be switched off during a braking operation in order to save fuel and avoid emissions. However, as a result a rapid start of the engine becomes necessary after the braking operation is terminated. For this reason, in one variant of the invention the generator is preferably connected at the output end to highly dynamic electrical energy stores (for example supercaps) from which the electrical energy for a rapid start of the engine can be obtained after the termination of the braking operation.

BRIEF DESCRIPTION OF THE DRAWINGS

Other advantageous variants of the invention are described in the subclaims or are explained in conjunction with the following description of the preferred exemplary embodiment of the invention by means of the drawings, in which:

DETAILED DESCRIPTION OF THE PREFERRED EMBODIMENTS

Figure 1:
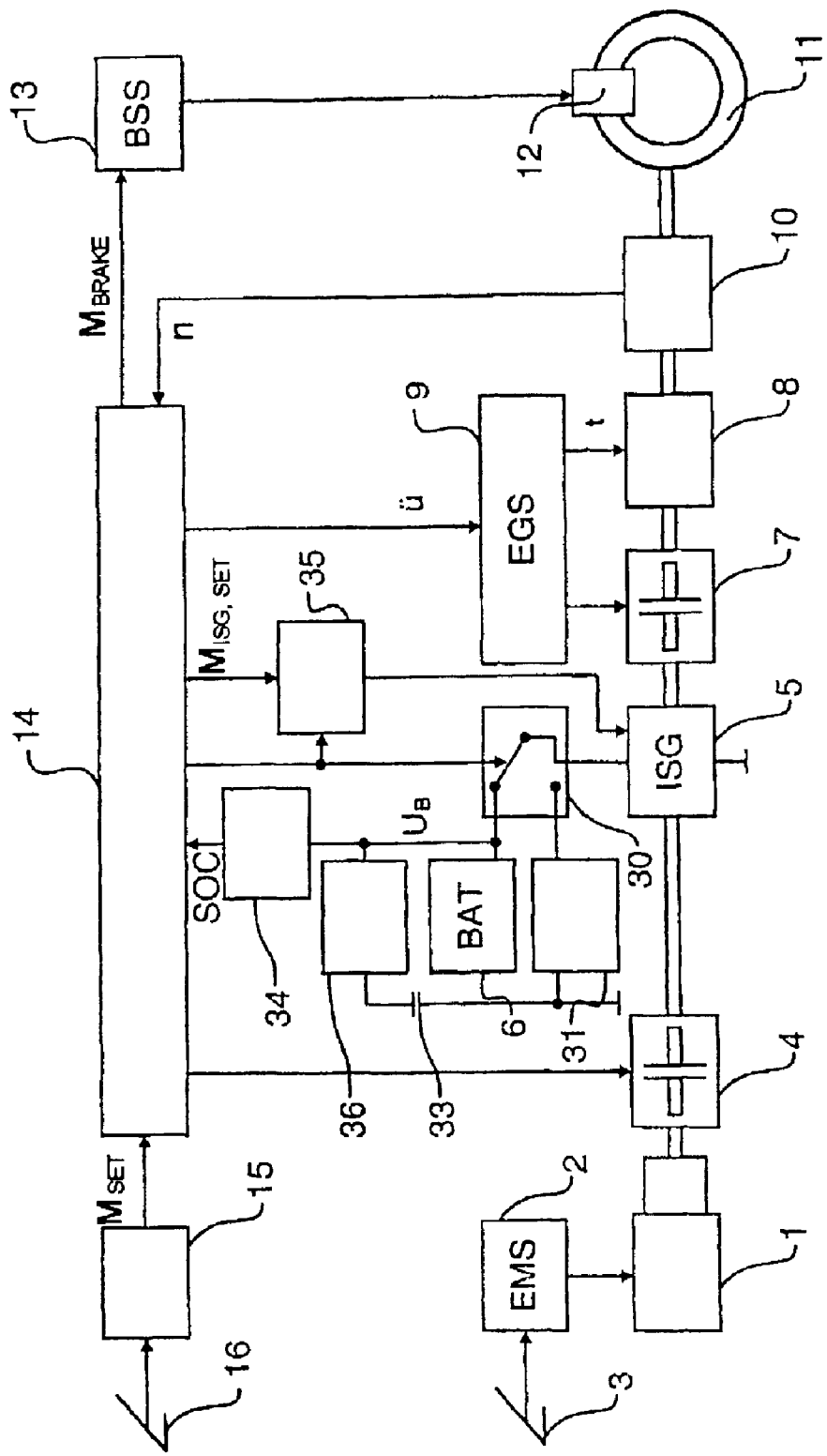
FIG. 1 shows the drive train of a motor vehicle as well as assistance systems and the control unit according to the invention.

The arrangement illustrated in FIG. 1 shows a drive train of a motor vehicle which is driven by an internal combustion engine 1, the internal combustion engine 1 being of conventional design and therefore only being illustrated schematically.

The internal combustion engine 1 is actuated by an electronic engine controller (EMS) 2 which receives, as an input signal, inter alia the position of an accelerator pedal 3.

At the output end, the internal combustion engine 1 is connected via a shaft to a clutch 4 which makes it possible to disconnect the internal combustion engine 1 from the drive train. This permits separation from the rotational speed of an integrated starter generator (ISG) 5 which is arranged in the drive train, as a result of which the braking effect of the starter generator (ISG) 5 is improved.

However, in the closed state, the clutch 4 connects the internal combustion engine 1 to the integrated starter-generator (ISG) 5 which operates as a generator in the driving mode and charges an electric battery 6. On the other hand, when the engine is stationary the integrated starter-generator 5 can be used to start the internal combustion engine 1.

Furthermore, a clutch 7 for a torque converter 8 is arranged in the drive train, it being possible to embody the clutch 7 for example as a wet clutch or dry clutch. The clutch 7 and the torque converter 8 are actuated by an electronic transmission controller (ETC) 9, the electronic transmission controller 9 being able to set five different transmission ratios t of the torque converter 8. The switching over between the individual gears in accordance with the different transmission ratios is carried out automatically here by the electronic transmission controller (ETC) 9 by means of corresponding actuation of the clutch 7 and of the torque converter 8. As an alternative to the illustrated transmission with fixed gears it is also possible to use a transmission with continuously settable transmission ratio.

In addition, a rotational speed sensor 10 which continuously measures the current rotational speed n of the drive train and is available for the purposes of signal processing, as described in more detail below, is arranged in the drive train.

Finally, the drive train is connected to a wheel 11 of the motor vehicle, a brake actuator 12 which enables the wheel 11 to be braked being arranged on the wheel 11. The brake actuator 12 may be, for example, a component of a piston brake or of a disk brake here and is actuated by a brake control system (BCS) 13, the brake control system (BCS) 13 receiving the desired braking torque MBrake of the service brake from a control unit 14. Within the scope of the invention, the brake system can either be embodied as a conventional hydraulic brake system or as an electronic brake system ("Brake by wire").

The desired overall braking torque MSET is determined by an evaluation unit 15 as a function of the activation of a brake pedal 16, the pedal position, the pedal force, the duration of the activation of the pedal and the speed of the activation of the pedal being taken into account, for example. The desired braking torque MSET is composed here, according to the following formula, of the braking torque Mv of the internal combustion engine, the braking torque MISG of the integrated starter-generator (ISG) 5, the braking torque MBrake of the service brake and the transmission ratio t:

$$MSET = M\text{Brake} + MISG \cdot t + Mv \cdot t$$

Figure 2:
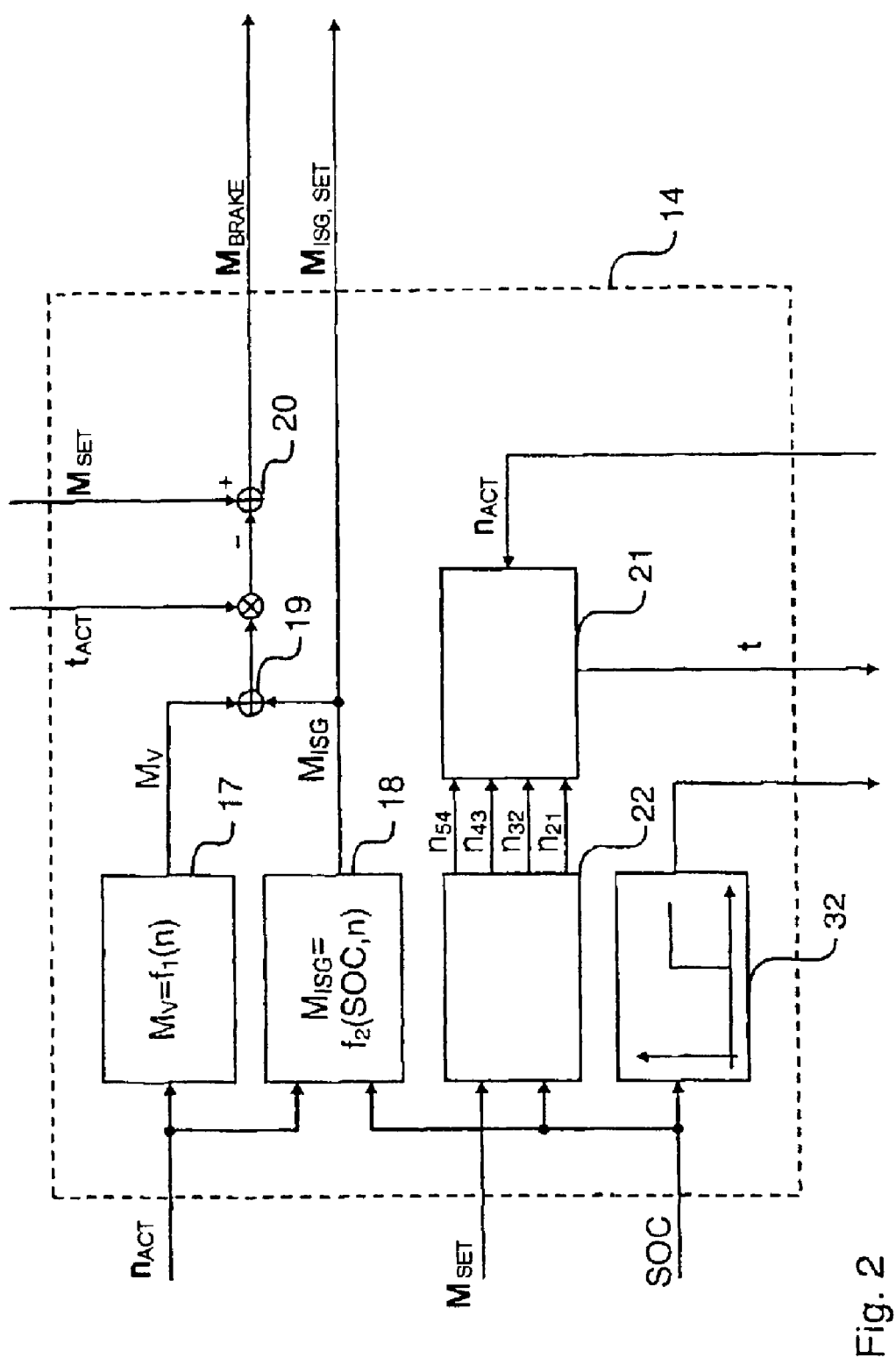
FIG. 2 shows the inventive control unit as a block circuit diagram.

The control unit 14 therefore firstly calculates the braking torque Mv of the internal combustion engine 1 and the maximum possible braking torque MISG of the integrated starter-generator (ISG) 5 in order to actuate the brake actuator 12 in order to generate the rest of the braking torque MBrake, as illustrated in the detailed view of the control unit 14 in FIG. 2.

For this purpose, the control unit 14 has a characteristic curve element 17 which at the input end receives the current rotational speed nACT from the rotational speed sensor 10 and calculates the braking torque Mv of the internal combustion engine 1 from it in accordance with a predetermined functional relationship $Mv = f1(nACT)$.

Furthermore, the control unit 14 has a second characteristic curve element 18 which is connected at the input end, on the one hand, to the rotational speed sensor 10 and, on the other hand, to a calculation unit 34, the calculation unit 34 being connected at the input end to the battery 6 and determining the charge status SOC of the battery 6 from the battery voltage UB. The characteristic curve element 18 determines calculates the braking torque of the integrator starter-generator (ISG) 5 from a predefined characteristic curve field $MISG = f2(SOC, nACT)$ as a function of the charge status SOC of the battery and of the rotational speed nIST. The braking torques Mv and MISG which are determined in this way are fed to an adder 19 which calculates the braking torque which permits the service brake to be relieved of loading and is connected at the output end to a subtractor 20 which calculates the necessary braking torque MBrake of the service brake from the predefined overall braking torque MSET and the sum of the braking torques of the integrated starter-generator (ISG) 5 and the internal combustion engine 1 taking into account the transmission ratio t, and passes on the necessary braking torque MBrake to the brake control system (BCS) 13.

Furthermore, the control unit 14 has a comparator unit 21 which is connected at the input end to the rotational speed sensor 10 and compares the current rotational speed nACT continuously with predefined shifting-down rotational speeds n54, n43, n32, n21 in order to actuate the electronic transmission controller (ETC) 9 when a shifting-down rotational speed is reached, in such a way that the torque converter 8 shifts down one gear. If the current rotational speed nACT drops, for example, as far as the shifting-down rotational speed n54 during a braking operation, the torque converter 8 shifts down from the fifth into the fourth gear. The shifting-down rotational speeds are calculated dynamically here as a function of the charge status of the battery 6 by means of a calculation unit 22 which is illustrated in more detail in FIG. 3.

In order to register the charge status of the battery 6, the calculation unit 22 firstly has a characteristic curve element 23 which is connected at the input end to the charge status calculation unit 34 which generates, at the output end, a signal SOC which represents the charge status of the battery 6. A multiplicative factor, which is limited to a maximum value below in a limiter 23, appears at the output of the characteristic curve element 23.

Figure 3:
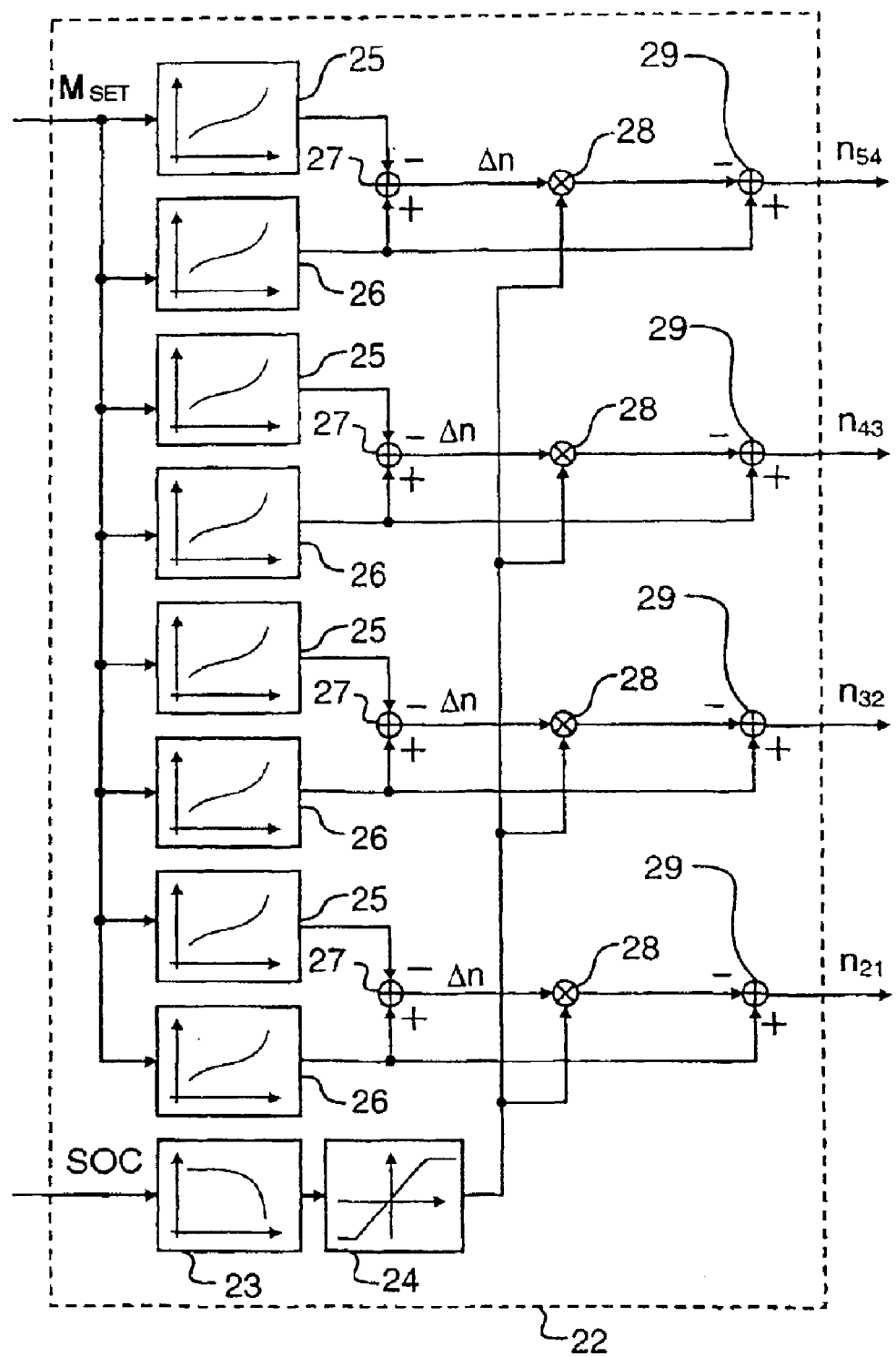
FIG. 3 shows the calculation unit, contained in the control unit according to the invention, for calculating the shifting-down points of the automatic transmission.

In order to calculate the four shifting-down rotational speeds n54, n43, n32, n21, the calculation unit 22 has four essentially corresponding assemblies so that in FIG. 3 in each case the same reference symbols are used for corresponding components and only one of the corresponding assemblies is described below.

Figure 4:
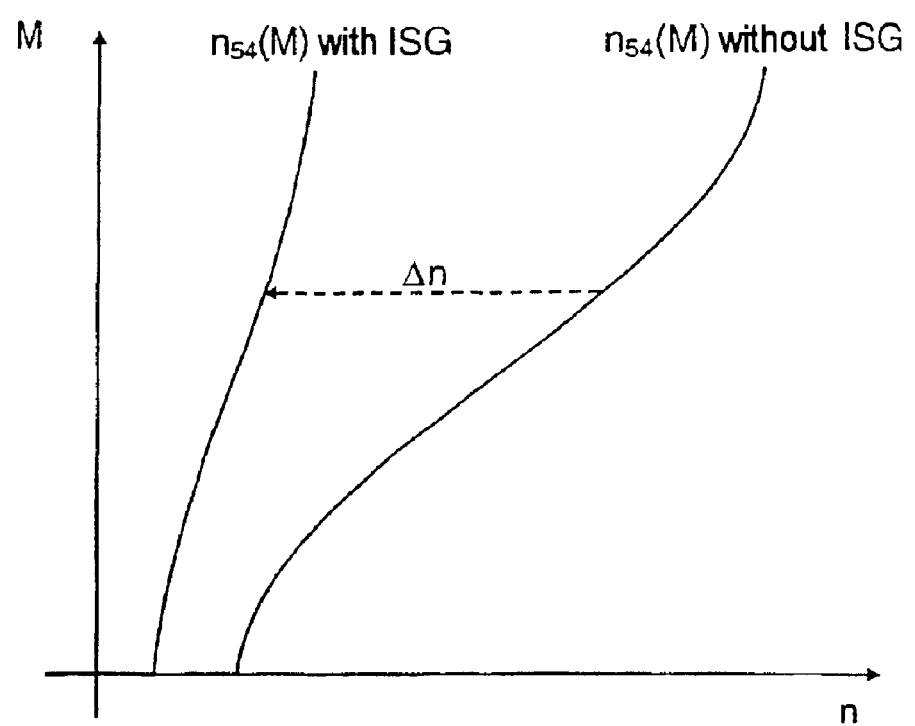
FIG. 4 shows the shifting-down rotational speed as a function of the desired braking torque.

Thus, each of the corresponding assemblies has two characteristic curve elements 25, 26 which receive the desired overall braking torque MSET at the input end and determine from it the respective shifting rotational speed ni,i-1 independently of the current charge status of the battery 6. The characteristic curves which are stored in the characteristic curve elements 25, 26 are illustrated by way of example in FIG. 6, the right-hand characteristic curve in FIG. 4 representing the shifting rotational speed without intervention of the integrated starter-generator (ISG) 5, (i.e. when SOC=max), whereas the left-hand characteristic curve represents the shifting rotational speed with optimum intervention of the integrated starter-generator (ISG), (i.e. when SOC=min). The actual shifting rotational speed here lies between the two characteristic curves illustrated in FIG. 4 depending on the current charge status of the battery 6. The shifting rotational speeds which are calculated by the two characteristic curve elements 25 and 26 therefore constitute extreme values and limit the bandwidth within which the shifting rotational speed actually lies. The characteristic curve elements 25, 26 are therefore connected at the output ends to a subtractor 27 which calculates the bandwidth An within which the shifting rotational speed lies. The output signal of the subtractor 27 is fed to a multiplier 28 which multiplies the bandwidth Δn by the signal which is dependent on the charge status of the battery 6. The product which is generated in this way is in turn fed to a subtractor 29 which is connected at the input end to the characteristic curve element 26 and therefore receives the shifting rotational speed which is obtained from the predefined braking torque MSET without taking into account the braking effect of the integrated starter-generator (ISG) 5. The output signal of the multiplier 28 is then subtracted from this "static" shifting rotational speed so that the actual shifting rotational speed is reduced in comparison with the "static" shifting rotational speeds without taking into account the integrated starter-generator (ISG) 5. If the battery 6 is, for example, completely discharged, the output signal of the limiter 24 assumes the value 1. Correspondingly, the multiplier 28 passes on the rotational speed bandwidth Δn completely to the subtractor 29 so that the shifting rotational speed is obtained from the characteristic curve shown on the left in FIG. 4. On the other hand, if the battery 6 is completely charged, the output signal of the limiter 24 assumes the value zero so that the shifting rotational speed which appears at the output of the subtractor 29 is obtained from the characteristic curve which is illustrated on the right in FIG. 4.

Moreover, the arrangement illustrated in FIG. 1 shows a controllable switching element 30 which connects the integrated starter-generator (ISG) 5 either to the battery 6 or to a load resistance arrangement 31. This enables the integrated starter-generator (ISG) 5 to be operated with a generating effect even if the battery 6 is already completely charged and for this reason cannot take up any more electrical energy. The switching element 30 is actuated here by means of an evaluation unit 32 which is arranged in the control unit 14 and which registers the charge status SOC of the battery 6 at the input end and disconnects the integrated starter-generator (ISG) 5 from the battery 6 when a predefined maximum value of the battery charge SOC is exceeded by the switching element 30, and connects it to the load resistance arrangement 31.

For load-free switching, it is possible to reduce the torque MISG,SET briefly. For this purpose, a switching element 35 is provided which, like the switching element 30, is actuated by the control unit 14. Depending on the actuation, the switching element 35 feeds either the setpoint value MISG, SET calculated by the control unit, or the value zero, to the generator 5 as setpoint value.

Finally, the integrated starter-generator 5 is connected to a highly dynamic energy store in the form of a supercap 33 by means of a further switching element 36, said supercap 33 taking up electrical energy in the generator mode and permitting rapid starting of the internal combustion engine 1 after the deactivation of the internal combustion engine 1 which takes place during a braking operation.

Figure 5:
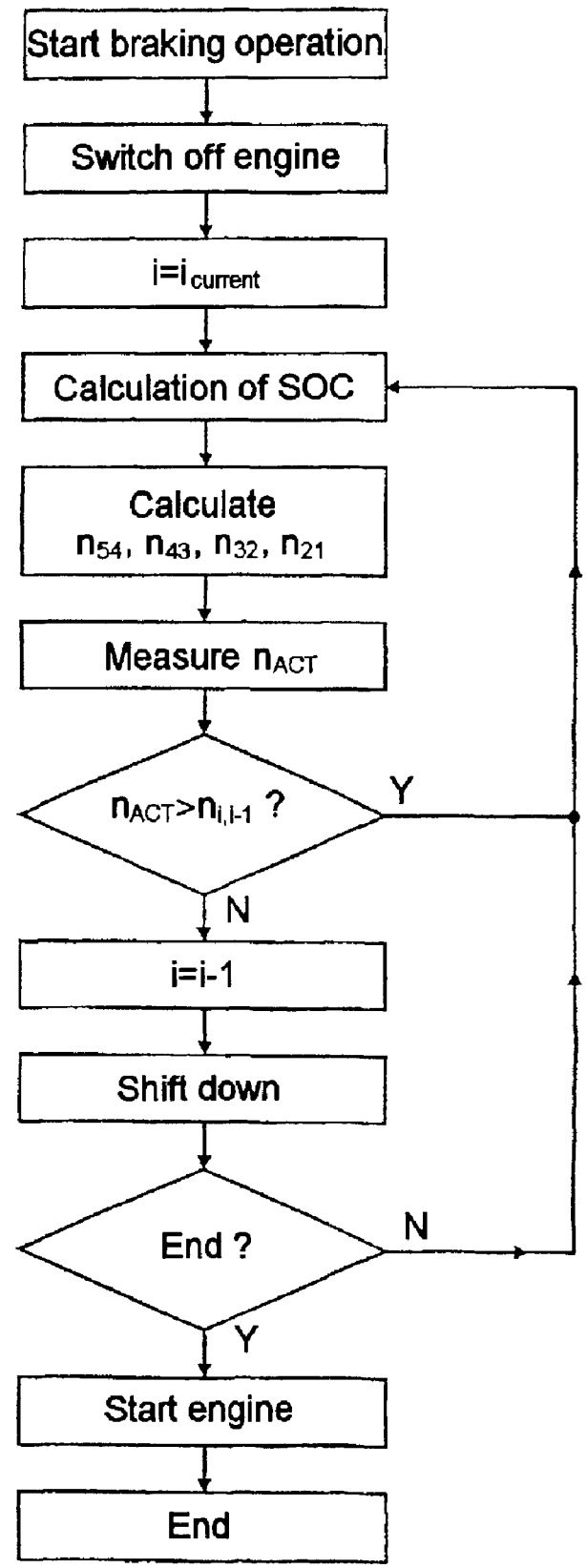
FIG. 5 shows a flow chart of the operating method according to the invention.

The operating method according to the invention for the control unit which is described above will now be explained with reference to the flowchart illustrated in FIG. 5, it being assumed, for the sake of simplification, that the torque converter 8 is operated in the highest gear at the start of the braking operation. At the start of the braking operation the engine is firstly switched off. Then, the battery voltage is measured in order to calculate the interpolated shifting-down rotational speeds n54, n43, n32, n21 as a function of the charge status SOC of the battery 6 and the predefined braking torque Mset, as illustrated in FIG. 3. The current rotational speed nACT is then measured by the rotational speed sensor 10 and compared with the previously calculated shifting rotational speeds n54, n43, n32, n21.

As long as the rotational speeds do not drop below the predefined shifting rotational speeds during the braking operation, they are calculated again dynamically and compared with the current rotational speed nACT.

When one of the predefined shifting rotational speeds is reached, the torque converter 8 then shifts down a gear, after which the shifting rotational speeds are calculated again dynamically. At the end of the braking operation, if appropriate the engine is then started, for which purpose the energy stored in the highly dynamic energy store 33 is used.

The invention is not restricted to the exemplary embodiments described above. Instead, it is conceivable to have a multiplicity of variants and refinements which make use of the inventive idea and for this reason also fall within the scope of protection.

What is claimed is:

1. A control unit for setting a transmission ratio of a transmission which is arranged in a drive tram together with an engine and an electric generator, in order to obtain braking assistance through a braking torque of the engine, and to bring about a braking torque of the electrical generator, the generator feeding a battery, said unit comprising a plurality of signal inputs for receiving a desired braking torque and a rotational speed of the engine and/or a speed of the vehicle, a comparator unit for comparing the rotational speed of the engine and/or the vehicle speed with switching points of the transmission, each switching point corresponding to a rotational speed of the engine or to a vehicle speed, and for determining the transmission ratio of the transmission suitable for achieving the desired braking torque, a signal output for outputting a control signal which determines the transmission ratio of the transmission, and a calculation unit for determining the switching points of the transmission as a function of a charge status of the battery wherein the switching points for a partially discharged battery are less than the corresponding switching points for a fully charted battery.

2. The control unit as claimed in claim 1, wherein the generator is connected at an output end to the battery via a controllable switching element in order to disconnect the generator from the battery when the battery is completely charged.

3. The control unit as claimed in claim 2, wherein the switching element is connected at an output end to the battery on the one hand, and to a load resistance arrangement on the other, in order to connect the generator to the load resistance arrangement when the battery is completely charged.

4. The control unit as claimed in claim 1, wherein the transmission ratio of the transmission which is output at the signal output when the battery is partially discharged is less than or equal to the transmission ratio of the transmission which is output at the signal output when the battery is completely charged.

5. The control unit as claimed in claim 4, wherein the transmission has a plurality of fixed transmission stages, wherein switching over between the transmission stages takes place in each case at predefined switching values of the speed of the vehicle or of the rotational speed.

6. The control unit as claimed in claim 1, wherein a clutch is arranged in the drive train between the generator and the engine.

7. The control unit as claimed in claim 1, wherein the generator is connected at an output end to a highly dynamic electrical energy store.

8. The control unit as claimed in claim 7, wherein the highly dynamic energy store is a supercap.

9. A method for operating a control unit for setting a transmission ratio of a transmission, comprising the steps:
receiving a desired braking torque,
determining the transmission ratio of the transmission;
determining a charge status of a battery; and
setting the transmission ratio of the transmission as a function of the charge status of the battery, wherein the transmission ratio set for a partially discharged battery is different than the transmission ratio set for a fully charged battery.

10. The method as claimed in claim 9, characterized by the following steps:
switching points of the transmission are determined as a function of the charge status of the battery, each switching point corresponding to a rotational speed of the engine or to a vehicle speed,
the rotational speed of the engine or the speed of the vehicle is measured, and
the transmission is shifted down when the switching points are reached.

11. The method as claimed in claim 9, wherein a generator is disconnected from the battery when the battery is completely charged.

12. The method as claimed in claim 11, wherein the generator is connected to a load resistance arrangement if the battery is completely charged.

13. The method as claimed in claim 9, wherein during the braking operation a generator is connected to a highly dynamic electrical energy store and charges it.

14. The method as claimed in claim 9, further comprising the step of receiving a rotational speed of the engine.

15. The method as claimed in claim 14, further comprising the step of receiving a vehicle speed.

16. The method as claimed in claim 9, further comprising the step of receiving a vehicle speed.

17. A control unit for setting a transmission ratio of a transmission which is arranged in a drive train together with an engine and an electric generator, in order to obtain braking assistance through a braking torque of the engine, and to bring about a braking torque of the electrical generator, the generator feeding a battery, said unit comprising:
a plurality of signal inputs for receiving a desired braking torque and a rotational speed of the engine and/or a vehicle speed;
a comparator unit for comparing the rotational speed of the engine and/or the vehicle speed with switching points of the transmission, each switching point corresponding to a rotational speed of the engine or to a vehicle speed, and for determining the transmission ratio of the transmission suitable for achieving the desired braking torque;
a signal output for outputting a control signal which determines the transmission ratio of the transmission;
a calculation unit for determining the switching points of the transmission as a function of a charge status of the battery wherein the switching points for a partially discharged battery are less than the corresponding switching points for a fully charged battery; and
the generator connected at an output end to the battery via a controllable switching element in order to disconnect the generator from the battery when the battery is completely charged.

18. The control unit as claimed in claim 17, wherein the switching element is connected at an output end to the battery on the one hand, and to a load resistance arrangement on the other, in order to connect the generator to the load resistance arrangement when the battery is completely charged.

19. A method for operating a control unit for setting a transmission ratio of a transmission in a vehicle braking operation, comprising the steps:
receiving a desired braking torque;
determining the transmission ratio of the transmission;
determining a charge status of a vehicle battery;
setting the transmission ratio of the transmission as a function of the charge status of the battery wherein the transmission ratio set for a partially discharged battery is different than the transmission ratio set for a fully charted battery; and
disconnecting the generator from the battery when the battery is completely charged.

20. The method as claimed in claim 19, wherein the generator is connected to a load resistance arrangement if the battery is completely charged.

21. A method for operating a control unit for setting the transmission ratio of a transmission in a vehicle braking operation, comprising the steps:
receiving a desired braking torque;
determining the transmission ratio of the transmission;
determining a charge status of a vehicle battery;
setting the transmission ratio of the transmission as a function of the charge status of the battery;
calculating an engine braking torque from a rotational speed of the engine;
calculating a generator braking torque from the charge status of the battery and a rotational speed of the generator;
calculating a necessary braking torque for a vehicle service brake from a predefined overall braking torque and the braking torques of the generator and of the engine; and
activating the service brake in accordance with the calculated necessary braking torque.

22. A method for operating a control unit for setting a transmission ratio of a transmission, comprising the steps:
receiving a desired braking torque,
determining the transmission ratio of the transmission;
determining a charge status of a battery;
setting the transmission ratio of the transmission as a function of the charge status of the battery, and
selectively deactivating an engine during a braking operation including application of the transmission ratio wherein
the braking torque of the engine is calculated from the rotational speed of the engine,
a braking torque of the generator is calculated from the charge status of the battery and a rotational speed of the generator,
a necessary braking torque of a service brake is calculated from a predefined overall braking torque and the braking torques of the generator and of the engine, and
the service brake is activated with the calculated necessary braking torque.

* * * * *